US012413646B2

(12) United States Patent
Tapse et al.

(10) Patent No.: US 12,413,646 B2
(45) Date of Patent: *Sep. 9, 2025

(54) METHODS AND APPARATUS TO FACILITATE METER TO METER MATCHING FOR MEDIA IDENTIFICATION

(71) Applicant: The Nielsen Company (US), LLC, New York, NY (US)

(72) Inventors: Sandeep Tapse, Oldsmar, FL (US); Daniel Nelson, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/333,524

(22) Filed: Jun. 12, 2023

(65) Prior Publication Data
US 2024/0106909 A1   Mar. 28, 2024

Related U.S. Application Data

(63) Continuation of application No. 17/723,081, filed on Apr. 18, 2022, now Pat. No. 11,785,105, which is a
(Continued)

(51) Int. Cl.
H04L 67/50 (2022.01)
(52) U.S. Cl.
CPC ................... H04L 67/535 (2022.05)
(58) Field of Classification Search
None
See application file for complete search history.

(56) References Cited

U.S. PATENT DOCUMENTS 4,739,398 A * 4/1988 Thomas ............... H04H 60/37
725/19
5,481,294 A   1/1996 Thomas et al.
(Continued)

OTHER PUBLICATIONS

Bachman, NielsenConnect to Measure ESPN's Multiple Platforms, Mediaweek, vol. 17, Issue 38, pp. 4 and 6, Oct. 22, 2007, 2 pages.
(Continued)

Primary Examiner — Tonia L Dollinger
Assistant Examiner — Ishrat Rashid

(57) ABSTRACT

Example methods, apparatus, systems and articles of manufacture are disclosed to facilitate meter to meter matching for media identification. Example apparatus disclosed herein include an unknown signature comparer, a stack counter, and a reference database updater. The unknown signature comparer is to select a candidate unknown signature segment meeting a threshold length from a set of unknown signature segments collected at a first audience measurement location, and compare individual signatures of the candidate unknown signature segment with a collection of unknown signature segments collected at a second audience measurement location. The stack counter is to count a number of times that the candidate unknown signature segment matches unknown signature segments in the collection, and identify the candidate unknown signature segment as a matched signature segment when the number of times meets a counter threshold. The reference database updater is to store the matched signature segment in a signature reference database.

20 Claims, 11 Drawing Sheets

Related U.S. Application Data continuation of application No. 17/027,265, filed on Sep. 21, 2020, now Pat. No. 11,310,326, which is a continuation of application No. 15/399,342, filed on Jan. 5, 2017, now Pat. No. 10,785,329.

(56) References Cited

U.S. PATENT DOCUMENTS

| | | | |
|---|---|---|---|
| 5,999,689 | A | 12/1999 | Iggulden |
| 6,574,594 | B2 | 6/2003 | Pitman et al. |
| 6,633,651 | B1 | 10/2003 | Hirzalla et al. |
| 8,094,872 | B1 | 1/2012 | Yagnik et al. |
| 9,256,675 | B1 | 2/2016 | Wiegering et al. |
| 9,277,255 | B1 | 3/2016 | Rowe |
| 9,294,815 | B2 | 3/2016 | McMillan |
| 9,497,505 | B2 | 11/2016 | Heffernan et al. |
| 10,009,635 | B2 | 6/2018 | Lee |
| 10,911,824 | B2 | 2/2021 | Tapse et al. |
| 11,356,773 | B2 | 6/2022 | Brunet et al. |
| 2006/0153296 | A1 | 7/2006 | Deng |
| 2007/0106405 | A1 | 5/2007 | Cook et al. |
| 2007/0124756 | A1* | 5/2007 | Covell ............... G06F 16/635 348/E7.071 |
| 2009/0089586 | A1* | 4/2009 | Brunk .................. G06V 20/46 713/176 |
| 2010/0131970 | A1* | 5/2010 | Falcon ................. H04H 60/56 725/19 |
| 2010/0263020 | A1* | 10/2010 | Harrison ............... G06F 16/40 726/1 |
| 2011/0088053 | A1 | 4/2011 | Lee |
| 2012/0076310 | A1* | 3/2012 | DeBusk ............... G10L 25/48 381/56 |
| 2012/0257116 | A1 | 10/2012 | Hendrickson et al. |
| 2013/0208942 | A1 | 8/2013 | Davis |
| 2014/0115626 | A1 | 4/2014 | Sarda et al. |
| 2014/0325555 | A1 | 10/2014 | Khader et al. |
| 2015/0254344 | A1 | 9/2015 | Kulkarni et al. |
| 2015/0289013 | A1* | 10/2015 | Nelson ............. H04N 21/25891 725/19 |
| 2015/0319489 | A1* | 11/2015 | McMillan ............... G06F 16/48 725/19 |
| 2016/0119672 | A1 | 4/2016 | Alonso et al. |
| 2016/0212495 | A1 | 7/2016 | Chang et al. |
| 2016/0232538 | A1 | 8/2016 | Papakostas et al. |
| 2016/0286266 | A1 | 9/2016 | Moshitch |
| 2016/0286285 | A1 | 9/2016 | Geyzel et al. |
| 2016/0366478 | A1 | 12/2016 | Muller et al. |
| 2016/0366492 | A1 | 12/2016 | Muller et al. |
| 2018/0191850 | A1 | 7/2018 | Tapse et al. |
| 2018/0278991 | A1 | 9/2018 | Tapse et al. |

OTHER PUBLICATIONS

Gibbons, Nielsen's Numbers: Behind the Ratings Giant's Plans to Stay Ahead of Competitors, Viewing Shifts, Cover Story, Multi-channel News, Sep. 2, 2013, pp. 10-11, 3 pages.

United States Patent and Trademark Office, Advisory Action, issued in connection with U.S. Appl. No. 16/180,992, dated Aug. 10, 2020, 5 pages.

United States Patent and Trademark Office, Final Office Action, issued in connection with U.S. Appl. No. 16/180,992, dated May 22, 2020, 21 pages.

United States Patent and Trademark Office, Non-Final Office Action, issued in connection with U.S. Appl. No. 16/180,992, dated Jan. 6, 2020, 20 pages.

United States Patent and Trademark Office, Non-Final Office Action, issued in connection with U.S. Appl. No. 17/164,828, dated Sep. 13, 2021, 31 pages.

United States Patent and Trademark Office, Non-Final Office Action, issued in connection with U.S. Appl. No. 17/833,565, dated Nov. 8, 2022, 35 pages.

* cited by examiner

METHODS AND APPARATUS TO FACILITATE METER TO METER MATCHING FOR MEDIA IDENTIFICATION

CROSS-REFERENCE TO RELATED APPLICATIONS

This patent is a continuation of U.S. patent application Ser. No. 17/723,081 (now U.S. Pat. No. 11,785,105), which was filed on Apr. 18, 2022, which is a continuation of U.S. patent application Ser. No. 17/027,265 (now U.S. Pat. No. 11,310,326), which was filed on Sep. 21, 2020, which is a continuation of U.S. patent application Ser. No. 15/399,342 (now U.S. Pat. No. 10,785,329), which was filed on Jan. 5, 2017. U.S. patent application Ser. No. 17/723,081; U.S. patent application Ser. No. 17/027,265; and U.S. patent application Ser. No. 15/399,342 are hereby incorporated herein by reference in their respective entireties. Priority to U.S. patent application Ser. No. 17/723,081; U.S. patent application Ser. No. 17/027,265; and U.S. patent application Ser. No. 15/399,342 is hereby claimed.

FIELD OF THE DISCLOSURE

This disclosure relates generally to monitoring media presentation and/or consumption, and, more particularly, to methods and apparatus to facilitate meter to meter matching for media identification.

BACKGROUND

In recent years, presentation of media to users has been monitored and measured through the use of, for example, digital signatures for media identification. Media monitoring companies make reference signatures of identified media (e.g., television programs, music, audio broadcasts, internet videos, audio and/or visual advertisements, etc.), typically to develop a reference database. As unidentified media is presented to a user, a series of signatures of the unidentified media is made. The signatures of the unidentified media are then compared to the reference signatures. When the signatures of the unidentified media match one or more of the reference signatures, the unidentified media is identified.

Figure 1:
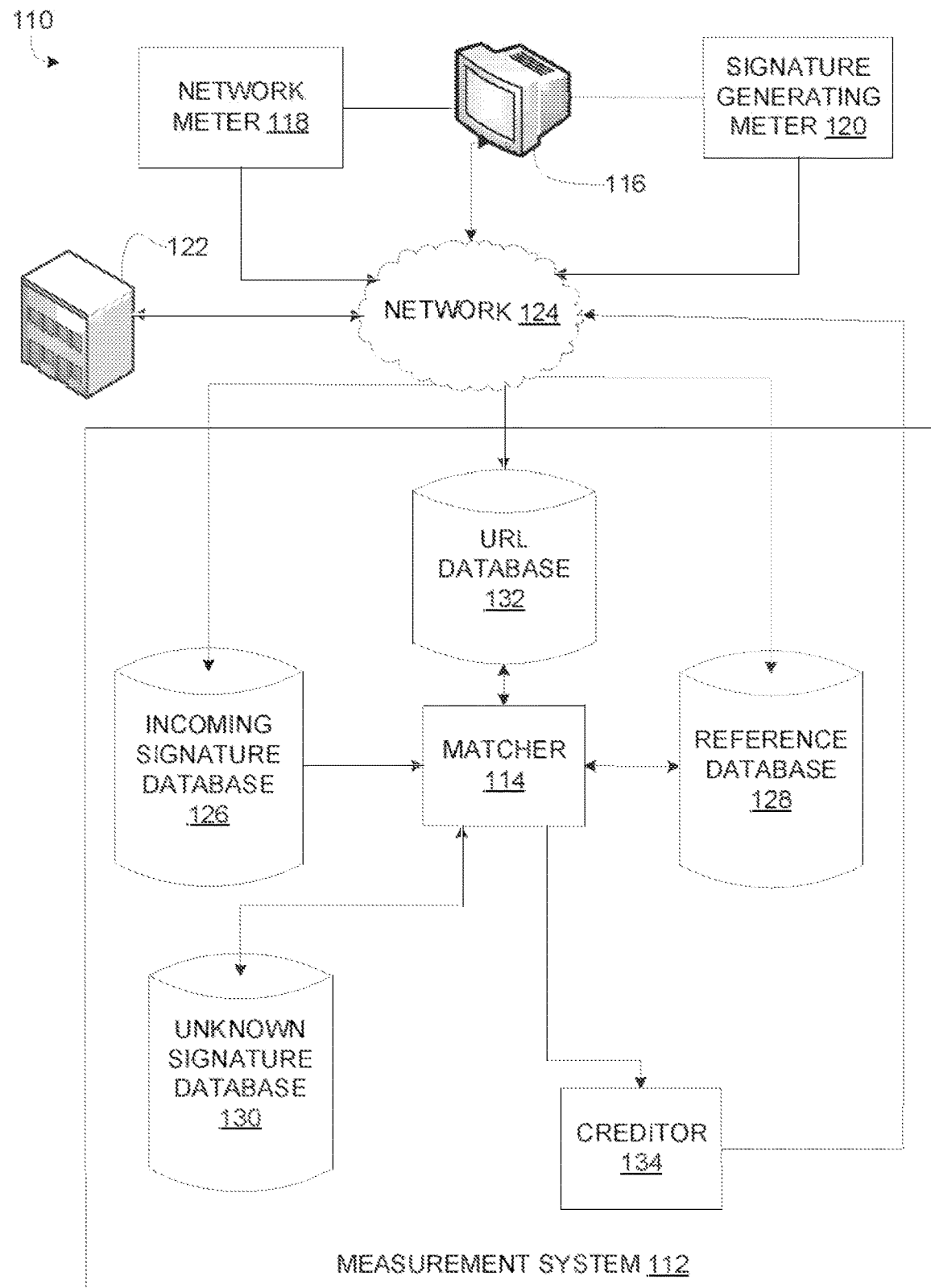
FIG. 1 is a block diagram of an example environment in which a measurement system implemented with a matcher constructed in accordance with the teachings of this disclosure operates to monitor media presentation.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Audience measurement companies desire to gain knowledge regarding how users interact with client devices (e.g., televisions, handheld mobile devices, smartphones, laptop computers, tablets, etc.). For example, monitoring companies want to monitor media (e.g., television programs, music, Internet videos, etc.) that is presented on the client devices to, among other things, monitor exposure to advertisements, determine advertisement effectiveness, determine user behavior, identify purchasing behavior associated with various demographics, credit media consumption rates, etc. Some known systems have utilized meters coupled to client devices to generate digital signatures of the media that is presented on the client device. In some examples, the generated signatures are associated with respective timestamps of when the signatures were generated. The meter-generated signatures are then compared to a database of reference signatures to identify and thus monitor media being viewed and/or heard with the client device.

Signature or fingerprint-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

In some examples, a piece of media may not yet be represented by a reference signature in the reference database (e.g., a newly released song, a rare and/or old recording, a regional broadcast, user generated media, etc.). In some such examples, the media not yet represented by a reference signature in the reference database is referred to as unreferenced media. In some such examples, meter-generated signatures of the media presented on client devices will not match the reference signatures in the reference database (e.g., no corresponding reference signature will be present in the reference database to match the meter-generated signature). Further, in some examples, multiple meters respectively coupled to different client devices may generate signatures associated with the same unreferenced media that are separated in time with respect to the unreferenced media (e.g., a signature from the beginning of an unreferenced song made by a first meter and a signature from the end of the same unreferenced song made by a second meter). Thus, meter-generated signatures of unreferenced media may, in fact, correspond to the same piece of unreferenced media.

Example systems, methods, and apparatus disclosed herein collect, analyze, collate, and associate signatures representative of unknown (e.g., unreferenced) media. In some examples, segments of unknown signatures are analyzed (e.g., compared, sorted, etc.) to locate matching individual signatures. In some such examples, the segments of unknown signatures having matching individual signatures are counted. In some such examples, the segments of unknown signatures having matching individual signatures are associated with a uniform resource locator (URL). In some such examples, the segments of unknown signatures are associated with a piece of media via information provided by the URL. Thus, in some examples, the media associated with the segments of unknown signatures is identified and the segments of unknown signatures become known. In some examples, the collected signatures for unknown media and/or now-known signatures are added to the reference database.

FIG. 1 is a block diagram of an example environment 110 in which a measurement system 112 implemented with a matcher 114 constructed in accordance with the teachings of this disclosure operates to monitor media presentation. The example environment 110 includes the measurement system 112, a client device 116, a network meter 118, a signature generating meter 120, a central facility 122, and a network 124. In the illustrated example of FIG. 1, the client device 116 is shown as a television, although further client devices are possible (e.g., smartphones, radios, computers, laptops, music players, disc readers, streaming media receivers, etc.) In some examples, the environment 110 includes a plurality of client devices 116, network meters 118, and signature generating meters 120. According to the illustrated example, the measurement system 112, the client device 116, the network meter 118, the signature generating meter 120, and the central facility 122 are interconnected via the example network 124. The example client device 116 is transmissibly coupled to the network meter 118 (e.g., wired, over Wi-Fi, over Bluetooth®, etc.). The example client device 116 is transmissibly coupled to the signature generating meter 120 (e.g., wired, over Wi-Fi, over Bluetooth®, etc.). The example client device 116 receives network distributed media detectable by the network meter 118 via the network 124. The example measurement system 112 is housed at the central facility 122. Alternatively, the example measurement system 112 may be housed at a remote location.

The example signature generating meter 120 generates signatures of the media presented on the client device 116. Based on the sampling rate of the example signature generating meter 120 and the length of time for which the media was presented, the signatures are generated as strings of individual signatures. For example, where the signature generating meter 120 has a sampling rate of three signatures per second and a piece of media is presented for one minute, a string of 180 individual signatures associated with the piece of media are produced in series. Further, the example signature generating meter 120 each generate the same signature strings for the same piece of presented media. For example, a first signature generating meter coupled to a first client device presenting a movie in Montana at 11:00 AM on a Saturday will generate the same (or substantially the same) signature string as a second signature generating meter coupled to a second client device presenting the same movie in Illinois at 8:00 PM on a Wednesday. Signature strings are to be explained in greater detail below in conjunction with FIGS. 3-6. The example signature generating meter 120 relays the signature strings to the example measurement system 112 via the example network 124.

The example measurement system 112 includes the example matcher 114, an example incoming signature database 126, an example reference database 128, an example unknown signature database 130, an example URL database 132, and an example creditor 134. The example client device 116, the example network meter 118, the example signature generating meter 120, the example central facility 122, the example incoming signature database 126, the example reference database 128, the example URL database 132, and the example creditor 134 are communicatively interconnected via the example network 124. The example matcher 114 is communicatively coupled to the example incoming signature database 126, the example reference database 128, the example unknown signature database 130, the example URL database 132, and to the example creditor 134.

In operation, when media is presented to users by the example client devices 116, the example signature generating meters 120 generate signature strings of the media and relay the signature strings to the example incoming signature database 126 via the example network 124. The example matcher 114 retrieves the signature strings from the incoming signature database 126 and attempts to match segments of the signature strings to a reference signature from the reference database 128. Where a signature segment of a signature string matches a reference signature, the example matcher 114 extracts the matching signature segment from the signature string. The example matcher 114 sends the matching signature segment to the example creditor 134 for crediting.

However, where a signature segment does not match a reference signature (e.g., because the media underpinning the signature string is not yet represented with a reference signature in the reference database 128), the example matcher 114 deposits the unknown (e.g., unmatched) signature segment in the example unknown signature database 130. As additional unknown signature segments are collected in the example unknown signature database 130, the example matcher 114 retrieves unknown signature segments from the example unknown signature database 130 and attempts to stack (e.g., associate, connect, attach, etc.) matching unknown signature segments together and redeposits the stacked-together unknown signature segments in the example unknown signature database 130. Thus, unknown signature segments originating from a single example signature generating meter 120 at different times and/or unknown signature segments originating from a plurality of example signature generating meters 120 are matched and associated together. Further features of the example matcher 114 related to stacking are described below with the aid of FIGS. 2-6.

The example network meter 118 deposits URLs of media presented on the example client device 116 in the URL database 132. The URLs provide identifying information of the presented media. When the number of stacked-together unknown signature segments reaches a threshold count (e.g., 5, 10, 15, etc.), the example matcher 114 attempts to match the stacked-together unknown signature segments to the URLs from the example URL database 132. Thus, the media represented by the unknown signature segments is identified, as will be described in greater detail with the aid of FIGS. 2-6.

The example matcher 114 sends the URL-matched stacked-together signature segments to the example creditor 134. The example creditor 134 counts (e.g., credits) instances of matched signatures per piece of identified media within a specified time period (e.g., weekly, monthly, quarterly, etc.) and relays the count to the example central facility 122 via the example network 124. The example matcher 114 sends the URL-matched signature segment to the example reference database 128 for storage as a reference signature, as will be described in greater detail with the aid of FIGS. 2-6.

Figure 2:
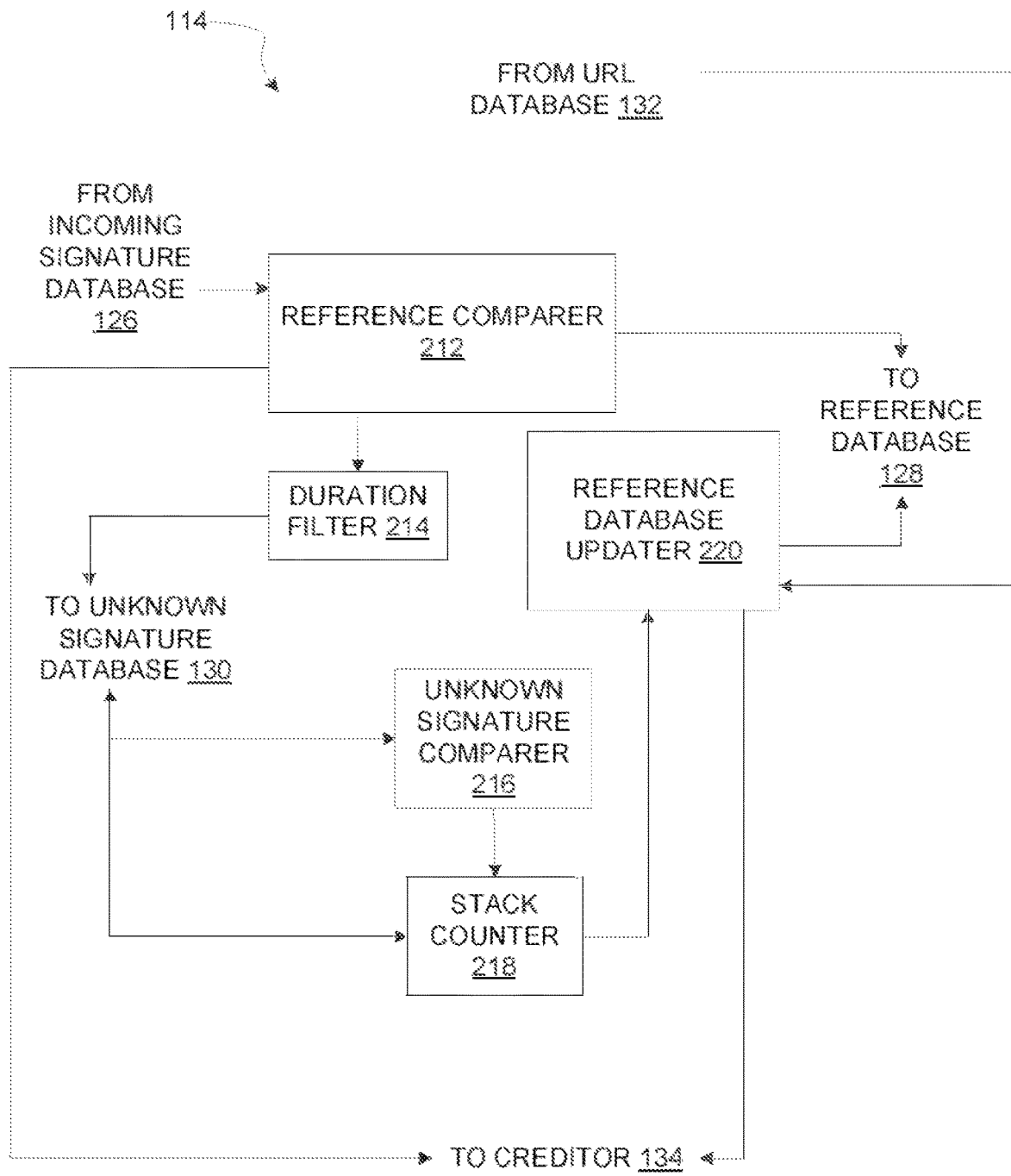
FIG. 2 is a block diagram of an example implementation of the matcher of the example measurement system of FIG. 1.

FIG. 2 is a block diagram of an example implementation of the matcher 114 of the example measurement system 112 of FIG. 1. The example matcher 114 includes an example reference comparer 212, an example duration filter 214, an example unknown signature comparer 216, an example stack counter 218, and an example reference database updater 220.

The example reference comparer 212 compares signature strings from the example incoming signature database 126 to reference signatures from the example reference database 128. Where the example reference comparer 212 matches a segment of a signature string from the example incoming signature database 126 with a reference signature, the reference comparer 212 extracts the matched signature segment from the signature string. The example reference comparer 212 sends the matched signature segment to the example creditor 134. Thus, unknown signature segments (e.g., segments of signature strings unmatched to a reference signature) are leftover. The example reference comparer 212 sends the unknown signature segments to the example duration filter 214.

The example duration filter 214 analyzes the unknown signature segments based on a threshold length (e.g., a number of individual signatures, a time duration, etc.). The example duration filter 214 discards unknown signature segments that do not meet the threshold length. The example duration filter 214 sends unknown signature segments meeting the threshold length to the example unknown signature database 130, as will be described in FIGS. 3-5. Thus, the example duration filter 214 acts as a high-pass filter for the unknown signature segments.

The example unknown signature comparer 216 retrieves and analyzes the individual signatures of the unknown signature segments from the example unknown signature database 130 to search for matching individual unknown signatures common to the unknown signature segments. When unknown signature segments having matching individual unknown signatures are found, the example unknown signature comparer 216 stacks (e.g., associates, connects, attaches, etc.) the unknown signature segments together at the matching individual unknown signatures and sends the unknown signature segments to the example stack counter 218, as will be described in further detail below in conjunction with FIGS. 3-5.

The example stack counter 218 counts the number of matched stacked unknown signature segments from the example unknown signature comparer 216. When the example stack counter 218 determines that the stacked-together unknown signature segments do not meet the threshold count described above, the stack counter 218 redeposits the stacked-together unknown signature segments in the example unknown signature database 130 When the example stack counter 218 determines that the stacked-together unknown signature segments meet the threshold count, the stack counter 218 sends the stacked-together unknown signature segments to the example reference database updater 220. The example reference database updater 220 retrieves URLs from the example URL database 132. The example reference database updater 220 compares timestamps of the individual signatures of the stacked-together unknown signature segments to timestamps of the retrieved URLs, as will be explained in greater detail in conjunction with FIG. 6.

Where the example reference database updater 220 finds matching timestamps (e.g., timestamps that indicate the same, or substantially the same, time of day and/or date) between a URL and an individual signature, the reference database updater 220 associates the unknown signature segment of the timestamp-matched individual signature with media-identifying information of the URL. The example reference database updater 220 further associates the remaining stacked-together unknown signature segments with the media identifying information. The example reference database updater 220 sends the media-identified stacked-together signature segments to the example creditor 134. The example reference database updater 220 sends one of the media-identified signature segments to the example reference database 128 for storage as a reference signature (e.g., the reference database 128 holds singular examples of signature segments as reference signatures).

Where the example reference database updater 220 does not find matching timestamps between a URL and an individual signature, the reference database updater 220 returns the stacked-together unknown signature segments to the example stack counter 218. In some such examples, the example stack counter 218 returns the stacked-together unknown signature segments to the example unknown signature database 130 as a stacked-together unknown signature segment bundle. The example stack counter 218 periodically (e.g., daily, weekly, monthly, quarterly, etc.) retrieves and sends the stacked-together unknown signature segment bundles from the example unknown signature database 130 to the example reference database updater 220 for a URL-matching reattempt.

Figure 3:
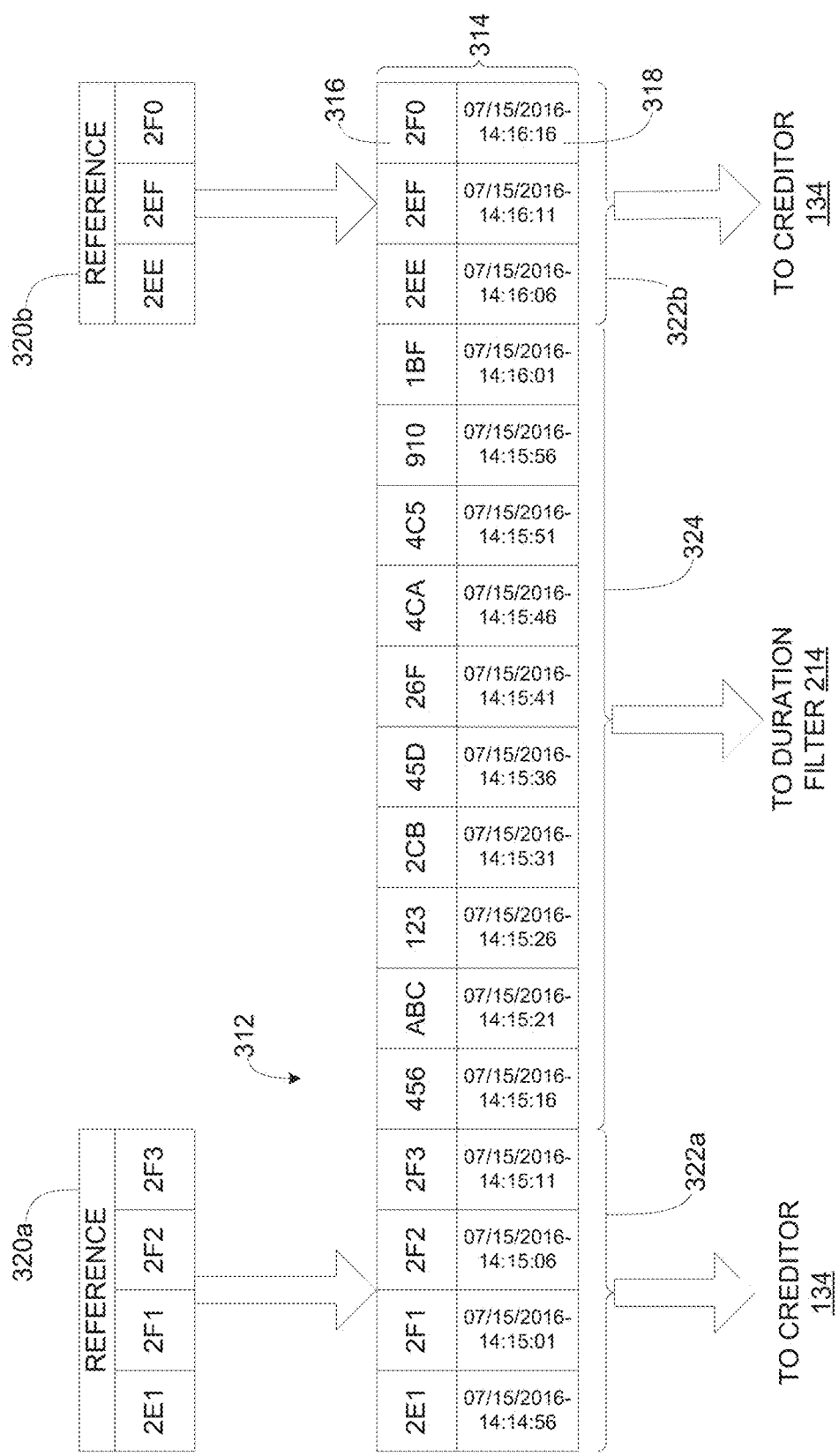
FIG. 3 illustrates an example signature string that may be processed by the example matcher of FIGS. 1 and/or 2.

FIG. 3 illustrates an example signature string that may be processed by the example matcher 114 of FIGS. 1 and/or 2. In the illustrated example of FIG. 3, signature string 312 is generated by the signature generating meter 120 of FIG. 1. In the illustrated example of FIG. 3, the signature string 312 is composed of a series of individual signatures 314. The example individual signatures each include a value (e.g., a hexadecimal number, a binary number, an integer, an identifier, a letter, etc.) associated with a signature timestamp. For example, the individual signature 314 with value 316 "2F0" is associated with the signature timestamp 318 "07/15/2016-14:16:16" (e.g., the example signature generating meter 120 of FIG. 1 generated value 316 "2F0" at 2:16:16 PM on Jul. 15, 2016). In the illustrated example of FIG. 3, reference signatures 320a, 320b are generated at the example central facility 122 of FIG. 1 and stored in the example reference database 128 of FIG. 1. Reference signatures are composed of a series of the values (e.g., "2E1," "2F1," "2F2," "2F3"). As the example reference signatures are used as a reference, they do not include signature timestamps. Alternatively, the reference signatures may be associated with a timestamp (e.g., reference signatures associated with live television, broadcast media, etc. may be associated with timestamps).

In operation, the example reference comparer 212 of FIG. 2 searches for known signature segments by comparing the signature string 312 to the reference signatures. The example reference comparer 212 of FIG. 2 searches for matching ordered values between the reference signature and the signature string. In the illustrated example of FIG. 3, reference signature 320a and the signature string 312 both include values "2E1," "2F1," "2F2," and "2F3" in the same order "2E1, 2F1, 2F2, 2F3." In the illustrated example of FIG. 3, reference signature 320b and the signature string 312 both include values "2EE," "2EF," and "2FO" in the same order "2EE, 2EF, 2FO." In operation, the example reference comparer 212 of FIG. 2 removes (e.g., cuts away, extracts, snips, excises, discards, etc.) the known signature segments from the signature string (e.g., removes known signature segments for the signature string to leave unknown signature segments). For example, the example reference comparer 212 of FIG. 2 removes known signature segments 322a, 322b from the signature string 312. The example reference comparer 212 of FIG. 2 sends the removed known signature segments to the creditor 134 of FIG. 1 to credit presentation, exposure, etc. of the known media.

After the known signature segments are removed from the signature string, an unknown signature segment remains (e.g., is leftover, persists, etc.). In the illustrated example of FIG. 3, after known signature segments 322a, 322b are removed from the signature string 312, the unknown signature segment 324 remains. The example reference comparer 212 of FIG. 2 sends the unknown signature segment 324 to the example duration filter 214 of FIG. 2.

The example duration filter 214 of FIG. 2 filters unknown signature segments based on a threshold length (e.g., 7 individual signatures, 30 seconds, etc.). In operation, the example duration filter 214 of FIG. 2 discards unknown signature segments shorter than the threshold length and sends unknown signature segments meeting the threshold length to the example unknown signature database 130 of FIG. 1. In the illustrated example of FIG. 3, given an example threshold length of 7 individual signatures, the example unknown signature segment 324 exceeds the threshold length and would thus be sent by the example duration filter 214 of FIG. 2 to the unknown signature database 130 of FIG. 1.

Figure 4:
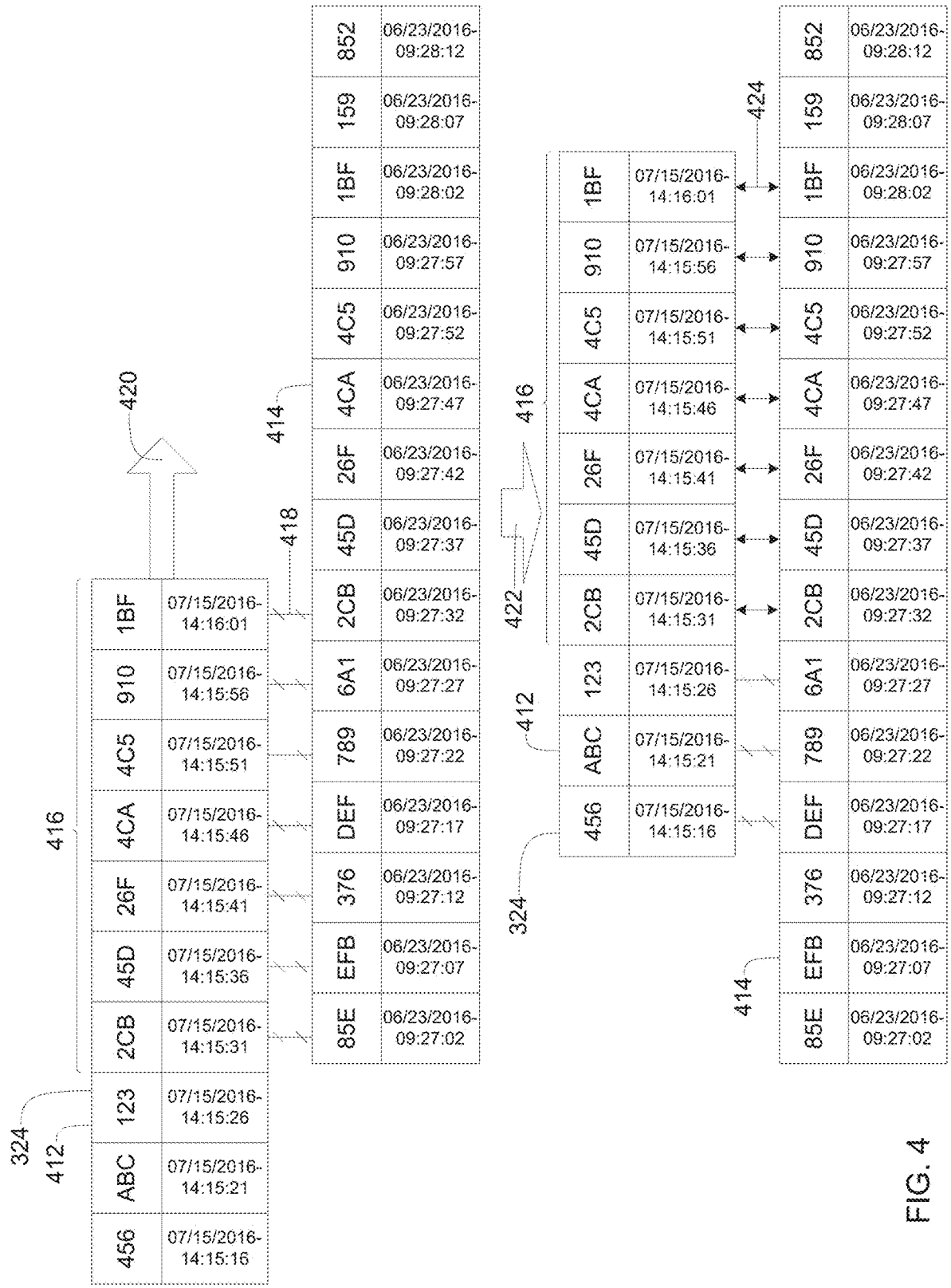
FIG. 4 illustrates an example set of signature segments that are matched by the example matcher of FIGS. 1 and/or 2.

FIG. 4 illustrates an example set of signature segments that are matched by the example matcher 114 of FIGS. 1 and/or 2. In operation, the example unknown signature comparer 216 of FIG. 2 retrieves a candidate unknown signature segment (e.g., the example unknown signature segment 324 of FIG. 3) and a comparison unknown signature segment from the example unknown signature database 130 of FIG. 1. The comparison unknown signature segment is composed of a series of individual signatures, each having a value and an associated signature timestamp. In the illustrated example of FIG. 4, the example unknown signature retriever 216 of FIG. 2 has retrieved unknown signature segment 324 of FIG. 3 as candidate unknown signature segment 412 and comparison unknown signature segment 414 from the example unknown signature database 130 of FIG. 1.

The example unknown signature comparer 216 aligns a match portion 416 of the candidate unknown signature segment 412 meeting a match threshold (e.g., 7 individual signatures, etc.) with the earliest individual signatures of the comparison unknown signature segment 414 meeting the match threshold. In some examples, the threshold length and the match threshold are equal in length. In operation, the example unknown signature comparer 216 of FIG. 2 then determines whether the values of the aligned individual signatures match. In operation, when the values of the aligned individual signatures do not match, as denoted by crossed lines 418 in FIG. 4, the example unknown signature comparer 216 of FIG. 2 advances the candidate unknown signature segment 412 along the comparison unknown signature segment 414 by one individual signature, as denoted by advancement arrow 420, and repeats the aligned individual signature value matching determination. In operation, the unknown signature comparer 216 of FIG. 2 repeats this advancing and determining process, as denoted by transition arrow 422 in FIG. 4, until matching values between aligned individual signatures meeting the match threshold are found, as denoted by double-arrowed lines 424. In operation, the example unknown signature comparer 216 of FIG. 2 then stacks the candidate and comparison unknown signature segments 412, 414 together at the matching values, as will be explained greater detail in conjunction with FIG. 5.

In operation, when matching values between the candidate unknown signature segment and the comparison unknown signature segment meeting the match threshold are not found, the example unknown signature comparer 216 of FIG. 2 returns the comparison unknown signature segment to the example unknown signature database 130 of FIG. 1 and selects a further comparison unknown signature segment to continue the comparison process. In operation, when the example unknown signature database 130 of FIG. 1 has been exhausted of comparison unknown signature segments, the example unknown signature comparer 216 of FIG. 2 returns the candidate unknown signature segment to the example unknown signature database 130 of FIG. 1 and selects a further candidate unknown signature segment to continue the comparison process.

Figure 5:
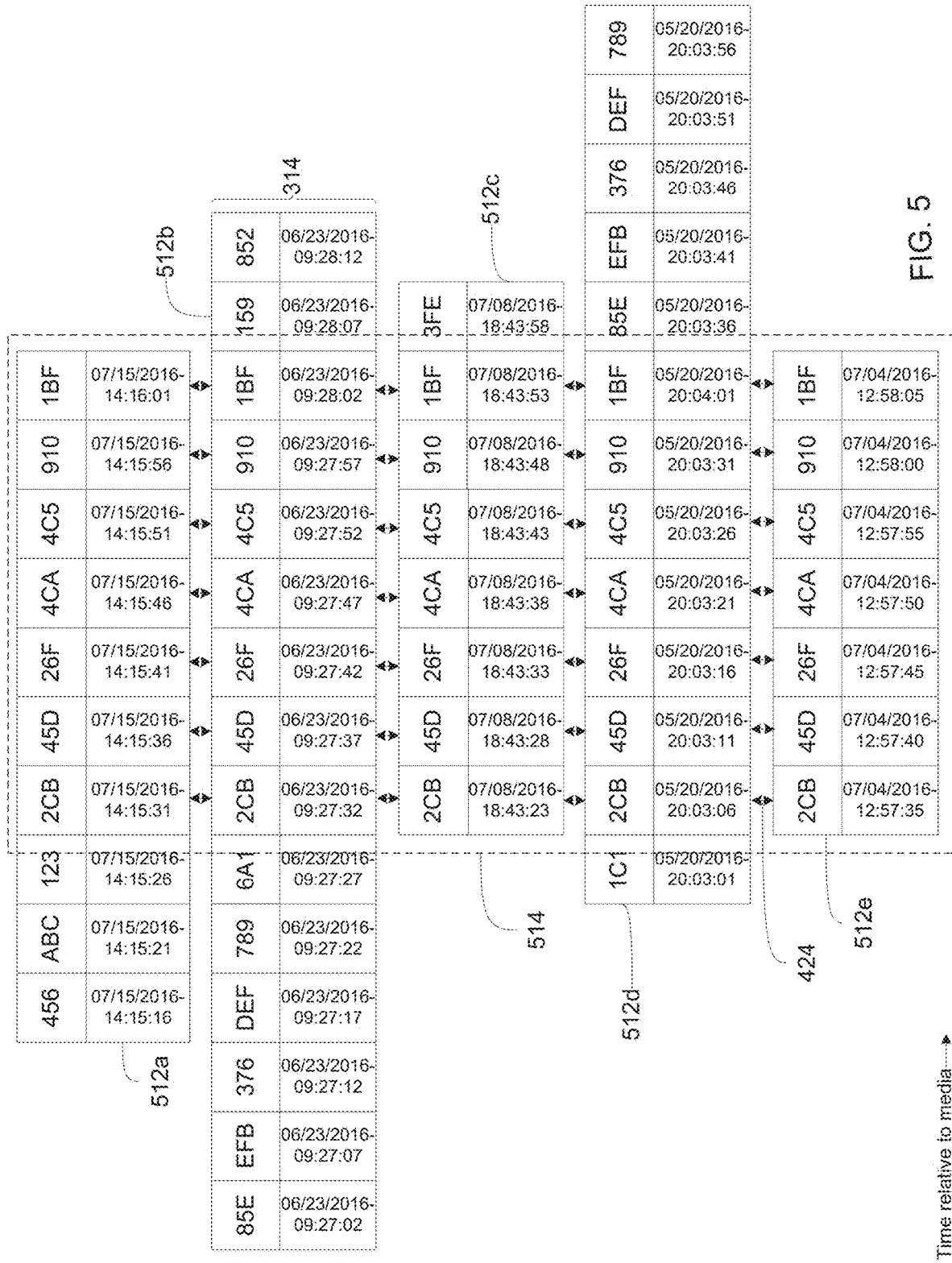
FIG. 5 illustrates example signature segments matched by the example matcher of FIGS. 1 and/or 2.

FIG. 5 illustrates example signature segments matched by the example matcher 114 of FIGS. 1 and/or 2. In operation, as the example unknown signature comparer 216 of FIG. 2 matches and stacks unknown signature segments, the example stack counter 218 of FIG. 2 counts the number of matched stacked unknown signature segments. In the illustrated example of FIG. 5, because five unknown signature segments 512a, 512b, 512c, 512d, 512e include values "2CB," "45D," "26F," "4CA," "4C5," "910," and "1BF" in the order "2CB, 45D, 26F, 4CA, 4C5, 910, 1BF," the example stack counter 218 of FIG. 2 counts five matched stacked unknown signature segments. In operation, when the number of matched stacked unknown signature segments meets a count threshold (e.g., five matched stacked unknown signature segments), the example stack counter 218 of FIG. 2 extracts a match core. The match core includes the individual signatures across which the unknown signature segments are stacked (e.g., the match core is composed of the portions of the unknown signature segments that have matching ordered values). In the illustrated example of FIG. 5, the match core 514 includes the individual signatures of unknown signature segments 512a, 512b, 512c, 512d, 512e that have ordered values "2CB, 45D, 26F, 4CA, 4C5, 910, 1BF," as denoted by the double-arrowed lines 424 of FIG. 4. The example stack counter 218 of FIG. 2 sends the match core to the example reference database updater 220 of FIG. 2.

Figure 6:
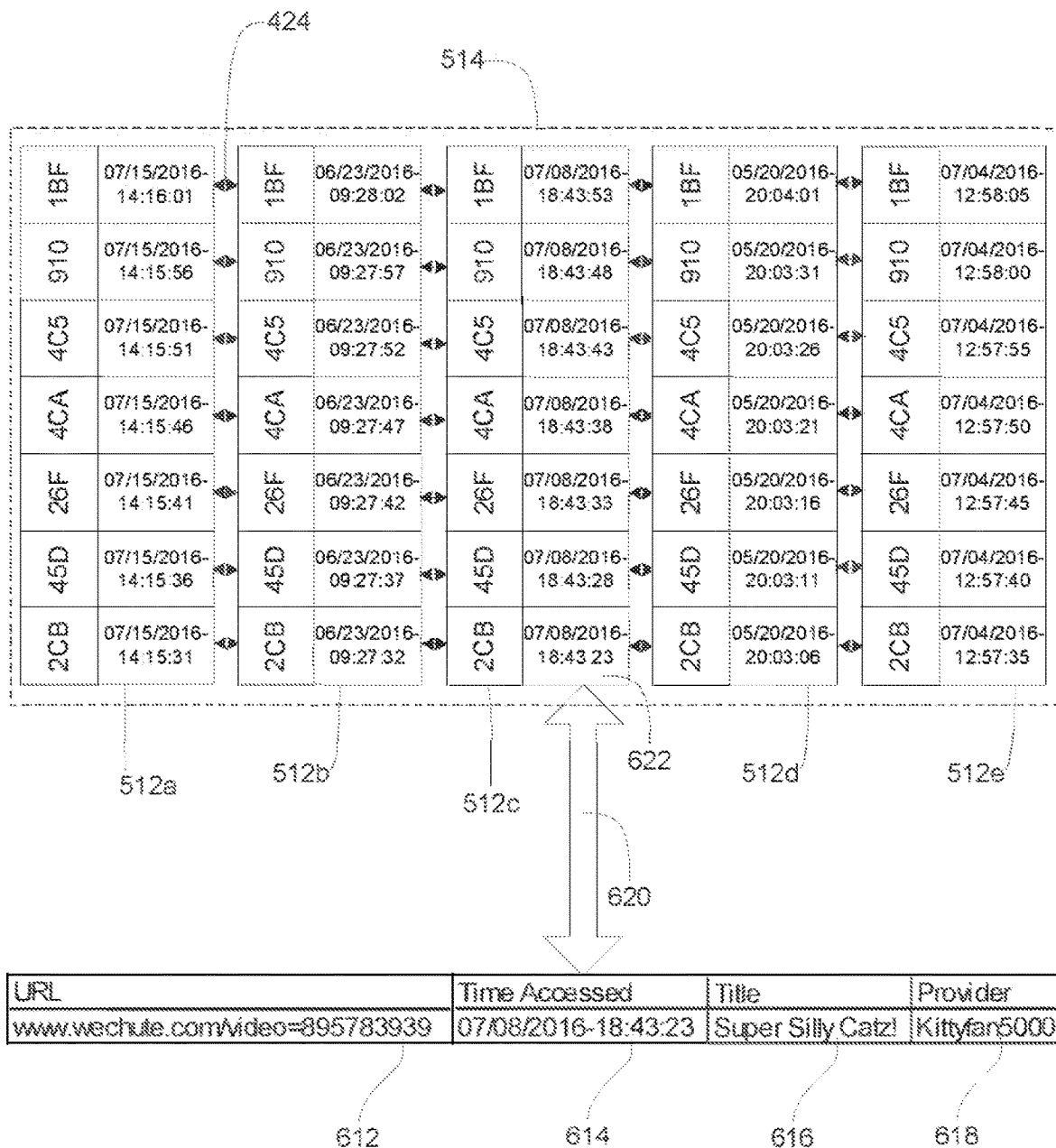
FIG. 6 illustrates an example uniform resource locator (URL) matched to one of the matching example signature segments of FIG. 5 by the example matcher of FIGS. 1 and/or 2.

FIG. 6 illustrates an example uniform resource locator (URL) matched to an unknown signature segment by the example matcher 114 of FIGS. 1 and/or 2. The URL is generated by the example network meter 118 of FIG. 1 based on online activity by a user and stored in the example URL database 132. The URL is associated with a network timestamp, a media title, and a media provider. In the illustrated example of FIG. 6, the URL 612 "www.wechute.com/video=895783939" is associated with the network timestamp 614 "07/08/2016-18:43:23," the media title 616 "Super Silly Catz!," and the media provider 618 "Kittyfan5000." In operation, the example reference database updater 220 of FIG. 2 retrieves the associated URL, network timestamp, media title, and media provider from the example URL database 132 of FIG. 1. In operation, to correlate the match core to the URL, the example reference database updater 220 then compares the network timestamp with the signature timestamps of the match core. In operation, when the example reference database updater 220 of FIG. 2 matches the network timestamp with one of the signature timestamps, the reference database updater 220 associates the unknown signature segment of the network timestamp-matching signature timestamp with the URL, the media title and the media provider, as denoted in FIG. 6 by association arrow 620. In operation, the example reference database updater 220 of FIG. 2 associates the remaining unknown signature segments of the match core with the URL, the media title, and the media provider via the unknown signature segment that has the network timestamp-matching signature timestamp as denoted by double-arrowed lines 424. In the illustrated example of FIG. 6, the unknown signature segment 512c of FIG. 5 including signature timestamp 622 "07/08/2016-18:43:23" is associated with URL 612 "www.wechute.com/video=895783939," media title 616 "Super Silly Catz!," and media provider 618 "Kittyfan5000" via the network timestamp 614 "07/08/2016-18:43:23." In the illustrated example of FIG. 6, the example reference database updater 220 of FIG. 2 associates the remaining unknown signature segments 512a, 512b, 512d, 512e of the match core 514 with the URL 612 "www.wechute.com/video=895783939," the media title 616 "Super Silly Catz!," and the media provider 618 "Kittyfan5000" via the unknown signature segment 512c that has signature timestamp 622 "07/08/2016-18:43:23." Thus, unknown signature segments of the match core are identified as representative of the media of the media title.

In operation, the example reference database updater 220 of FIG. 2 sends the match core to the example creditor 134 of FIG. 1 which credits presentation views to the media of media title according to the number of now-known signature segments in the match core. In operation, the example reference database updater 220 of FIG. 2 updates the example reference database 128 of FIG. 1 with the ordered values of the now-known signature segments and the associated media title and media provider. In the illustrated example of FIG. 6, the ordered values "2CB, 45D, 26F, 4CA, 4C5, 910, 1BF" shared by the unknown signature segments 512a, 512b, 512c, 512d, 512e and the associated media title 616 and media provider 618 are added to the reference database 128 by the reference updater 220. Thus, in some examples, unknown signature segments are transformed into reference signatures.

While an example manner of implementing the example matcher 114 of FIG. 1 is illustrated in FIG. 2, one or more of the elements, processes and/or devices illustrated in FIG. 2 may be combined, divided, re-arranged, omitted, eliminated and/or implemented in any other way. Further, the example reference comparer 212, the example duration filter 214, the example unknown signature comparer 216, the example stack counter 218, the example reference database updater 220 and/or, more generally, the example matcher 114 of FIGS. 1-2 may be implemented by hardware, software, firmware and/or any combination of hardware, software and/or firmware. Thus, for example, any of the example reference comparer 212, the example duration filter 214, the example unknown signature comparer 216, the example stack counter 218, the example reference database updater 220 and/or, more generally, the example matcher 114 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example matcher 114, the example reference comparer 212, the example duration filter 214, the example unknown signature comparer 216, the example stack counter 218 and/or the example reference database updater 220 is/are hereby expressly defined to include a tangible computer readable storage device or storage disk such as a memory, a digital versatile disk (DVD), a compact disk (CD), a Blu-ray disk, etc. storing the software and/or firmware. Further still, the example matcher 114 of FIGS. 1 and/or 2 may include one or more elements, processes and/or devices in addition to, or instead of, those illustrated in FIG. 2, and/or may include more than one of any or all of the illustrated elements, processes and devices.

Flowcharts representative of example machine readable instructions for implementing the example matcher 114 of FIGS. 1 and/or 2 are shown in FIGS. 7-10. In this example, the machine readable instructions comprise a program(s) for execution by a processor such as the processor 1112 shown in the example processor platform 1100 discussed below in connection with FIG. 11. The program may be embodied in software stored on a tangible computer readable storage medium such as a CD-ROM, a floppy disk, a hard drive, a digital versatile disk (DVD), a Blu-ray disk, or a memory associated with the processor 1112, but the entire program(s) and/or parts thereof could alternatively be executed by a device other than the processor 1112 and/or embodied in firmware or dedicated hardware. Further, although the example program(s) is described with reference to the flowcharts illustrated in FIGS. 7-10, many other methods of implementing the example matcher 114 may alternatively be used. For example, the order of execution of the blocks may be changed, and/or some of the blocks described may be changed, eliminated, or combined.

As mentioned above, the example processes of FIGS. 7-10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 7-10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 7:
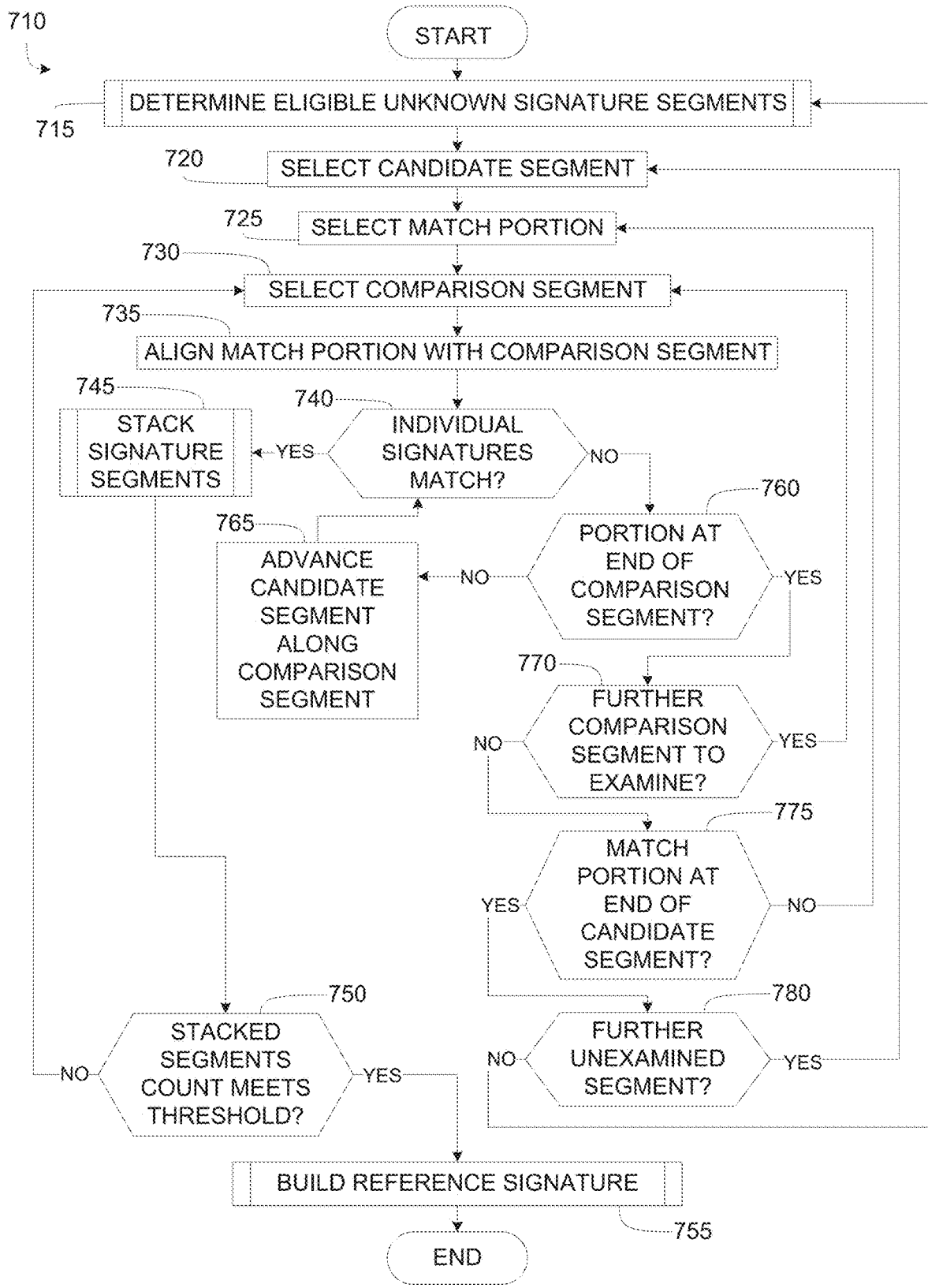
FIG. 7 is a flowchart representative of example machine-readable instructions that may be executed to implement the example matcher of FIGS. 1 and/or 2.

FIG. 7 is a flowchart representative of example machine-readable instructions 710 that may be executed to implement the example matcher 114 of FIGS. 1 and/or 2. The example instructions 710 may be performed, for example, to match unknown signature segments together to identify unknown presented media.

To start, the example matcher 114 determines eligible unknown signature segments (e.g., signatures that are not identified in a reference database and meet a threshold length) for analysis, as will be described in greater detail in connection with FIG. 8 (block 715). Next, the example unknown signature comparer 216 of the example matcher 114 selects a candidate unknown signature segment from the unknown signature database 130 of the example measurement system 112 (block 720). The example unknown signature comparer 216 further selects a match portion of the candidate unknown signature segment (block 725). The example unknown signature comparer 216 further selects a comparison unknown signature segment from the unknown signature database 130 (block 730). The example unknown signature comparer 216 then aligns the match portion with the comparison unknown signature segment (block 735). The example unknown signature comparer 216 then compares the match portion and the comparison unknown signature segment to determine whether the individual signatures of the match portion match the individual signatures of the comparison unknown signature segment aligned with the match portion (block 740).

If the individual signatures of the match portion match the individual signatures of the comparison unknown signature segment aligned with the match portion, the example unknown signature comparer 216 stacks the matching signature segments at the matching individual signatures, as will be described in greater detail in connection with FIG. 9 (block 745). Next, the example stack counter 218 of the example matcher 114 determines whether the number of matching unknown signature segments meets the count threshold (block 750). If the number of matching unknown signature segments does not meet the count threshold, the instructions 710 return to block 730.

If the number of matching unknown signature segments meets the count threshold, the example reference database updater 220 of the example matcher 114 builds a reference signature from the matching unknown signature segments, as will be described in greater detail in connection with FIG. 10, (block 755) and the instructions 710 end.

Referring back to block 740, if the individual signatures of the match portion do not match the individual signatures of the comparison unknown signature segment aligned with the match portion, the example unknown signature comparer 216 determines whether the match portion is at the latest-in-time end of the comparison unknown signature segment (block 760). If the match portion is not at the latest-in-time end of the comparison unknown signature segment, the example unknown signature comparer 216 advances the candidate unknown signature segment along the comparison unknown signature segment (block 765) and the instructions 710 return to block 740. If the match portion is at the latest-in-time end of the comparison unknown signature segment, the example unknown signature comparer 216 determines whether additional unanalyzed unknown signature segments are available for comparison (block 770).

If additional unanalyzed unknown signature segments are available for comparison, the instructions 710 return to block 730. If additional unanalyzed unknown signature segments are not available for comparison, the example unknown signature comparer 216 determines whether the match portion is at the earliest-in-time end of the candidate unknown signature segment (block 775).

If the match portion is not at the earliest-in-time end of the candidate unknown signature segment, the instructions 710 return to block 725. If the match portion is at the earliest-in-time end of the candidate unknown signature segment, the example unknown signature comparer 216 determines whether further unanalyzed unknown signature segments are available for examination as candidate unknown signature segments (block 780).

If further unanalyzed unknown signature segments are available for examination as candidate unknown signature segments, the instructions 710 return to block 720. If further unanalyzed unknown signature segments are not available for examination as candidate unknown signature segments, the instructions 710 return to block 715

Figure 8:
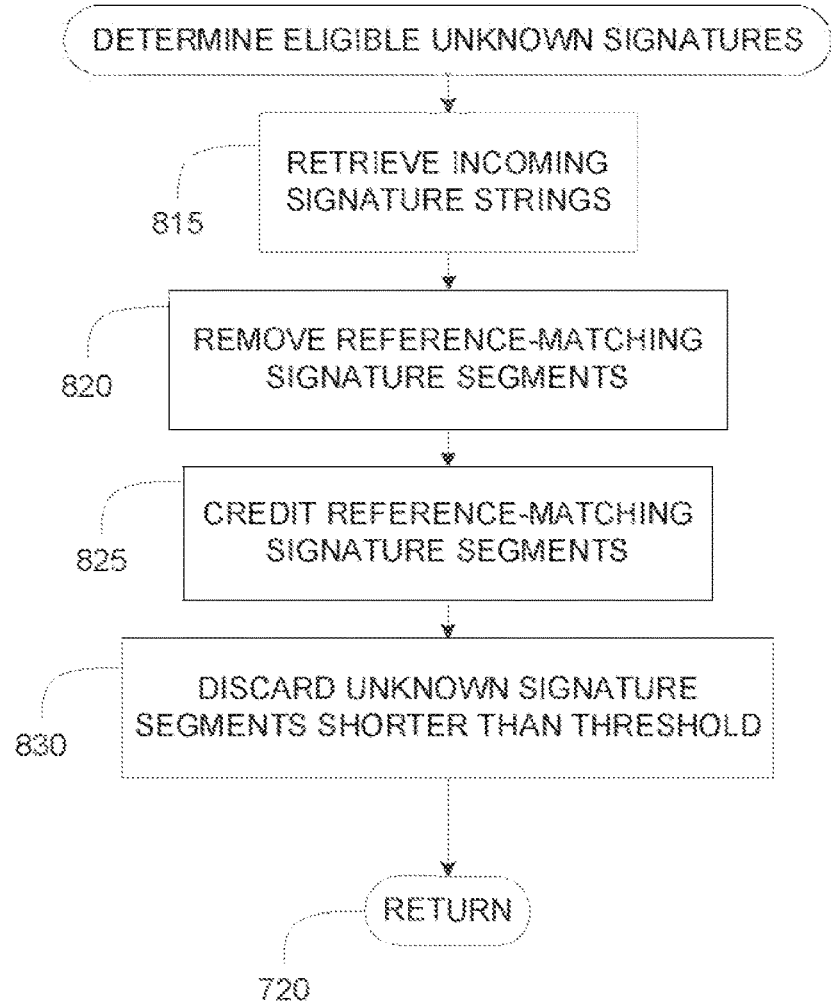
FIG. 8 is a flowchart representative of example machine-readable instructions that may be executed to implement block 715 of the example machine-readable instructions of FIG. 7.

FIG. 8 is a flowchart representative of example machine-readable instructions that may be executed to implement block 715 of the example machine-readable instructions of FIG. 7.

To determine eligible unknown signature segments, the example reference comparer 212 of FIG. 2 of the example matcher 114 of FIGS. 1 and 2 retrieves incoming signature strings from the example incoming signature database 126 of the example measurement system 112 of FIG. 1 collected from the example signature generating meters 120 of FIG. 1 (block 815). Next, the example reference comparer 212 removes signature segments from the signature strings that match reference signatures stored in the example reference database 128 of the example measurement system 112 from unknown signature segments (block 820). Then, the example creditor 134 of FIG. 2 of the example measurement system 112 of FIG. 1 credits media according to the reference matched signature segments (block 825). Further, the example duration filter 214 of FIG. 2 of the example matcher 114 discards unknown signature segments that do not meet a threshold length and stores unknown signature segments meeting the length threshold in the example unknown signature database 130 (block 830). The instructions 715 of FIG. 8 end and control returns to block 720 of FIG. 7.

Figure 9:
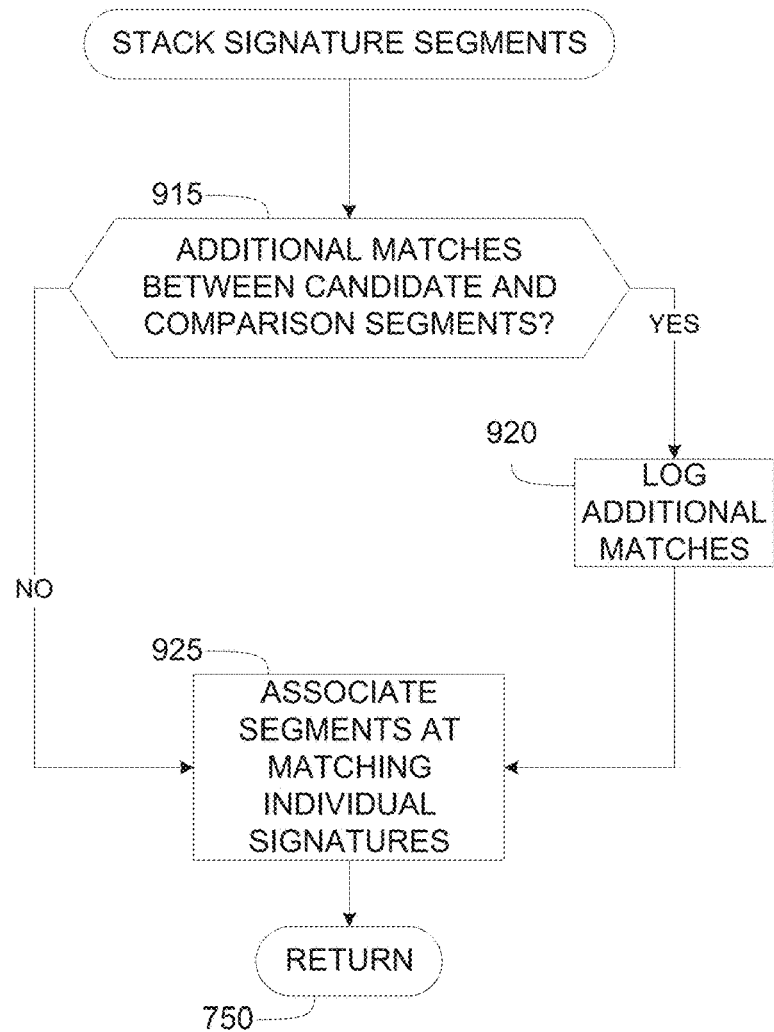
FIG. 9 is a flowchart representative of example machine-readable instructions that may be executed to implement block 745 of the example machine-readable instructions of FIG. 7.

FIG. 9 is a flowchart representative of example machine-readable instructions that may be executed to implement block 745 of the example machine-readable instructions of FIG. 7.

To stack matching unknown signature segments, the example unknown signature comparer 216 determines whether additional individual signatures of the candidate unknown signature segment and the comparison unknown signature segment match (block 915).

If additional individual signatures of the candidate unknown signature segment and the comparison unknown signature segment match, the example unknown signature comparer 216 logs the additional matches (block 920). Next, the example unknown signature comparer 216 associates the candidate unknown signature segment and the comparison unknown segment at the matching individual signatures (block 925). The instructions 745 of FIG. 9 end and control returns to block 750 of FIG. 7.

If additional individual signatures of the candidate unknown signature segment and the comparison unknown signature segment do not match, the instructions 710 progress to block 925.

Figure 10:
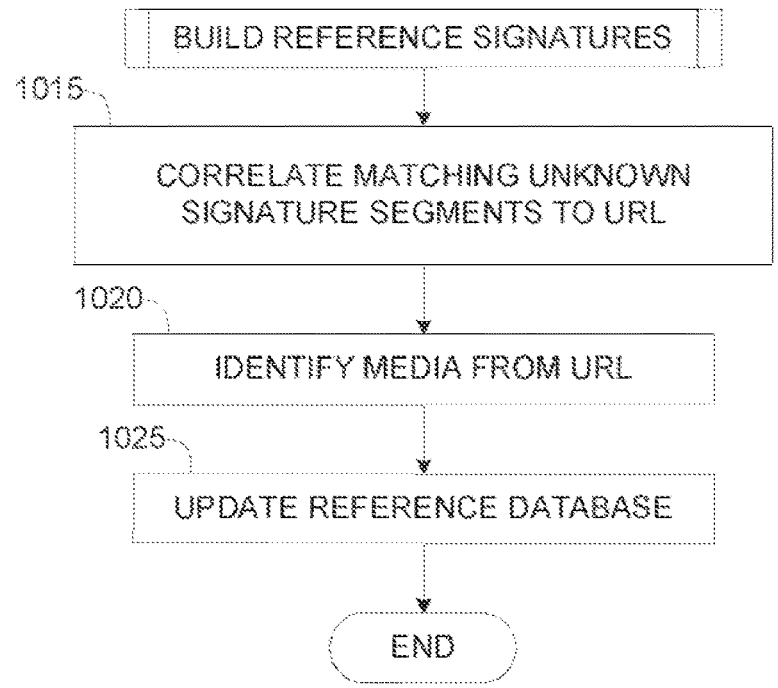
FIG. 10 is a flowchart representative of example machine-readable instructions that may be executed to implement block 755 of the example machine-readable instructions of FIG. 7.

FIG. 10 is a flowchart representative of example machine-readable instructions that may be executed to implement block 755 of the example machine-readable instructions of FIG. 7.

To build a reference signature from the stacked unknown signature segments, the example reference database updater 220 correlates the stacked unknown signature segments to a URL from the URL database 132 via a signature timestamp of the stacked unknown signature segments and a network timestamp associated with the URL (block 1015). Then, the example reference database updater 220 identifies the media represented by the unknown signature segment is from the URL (block 1020). Further, the example reference database updater 220 updates the example reference database 128 with the now-known signature segment as a reference signature (block 1025). The instructions 755 of FIG. 10 then end.

Figure 11:
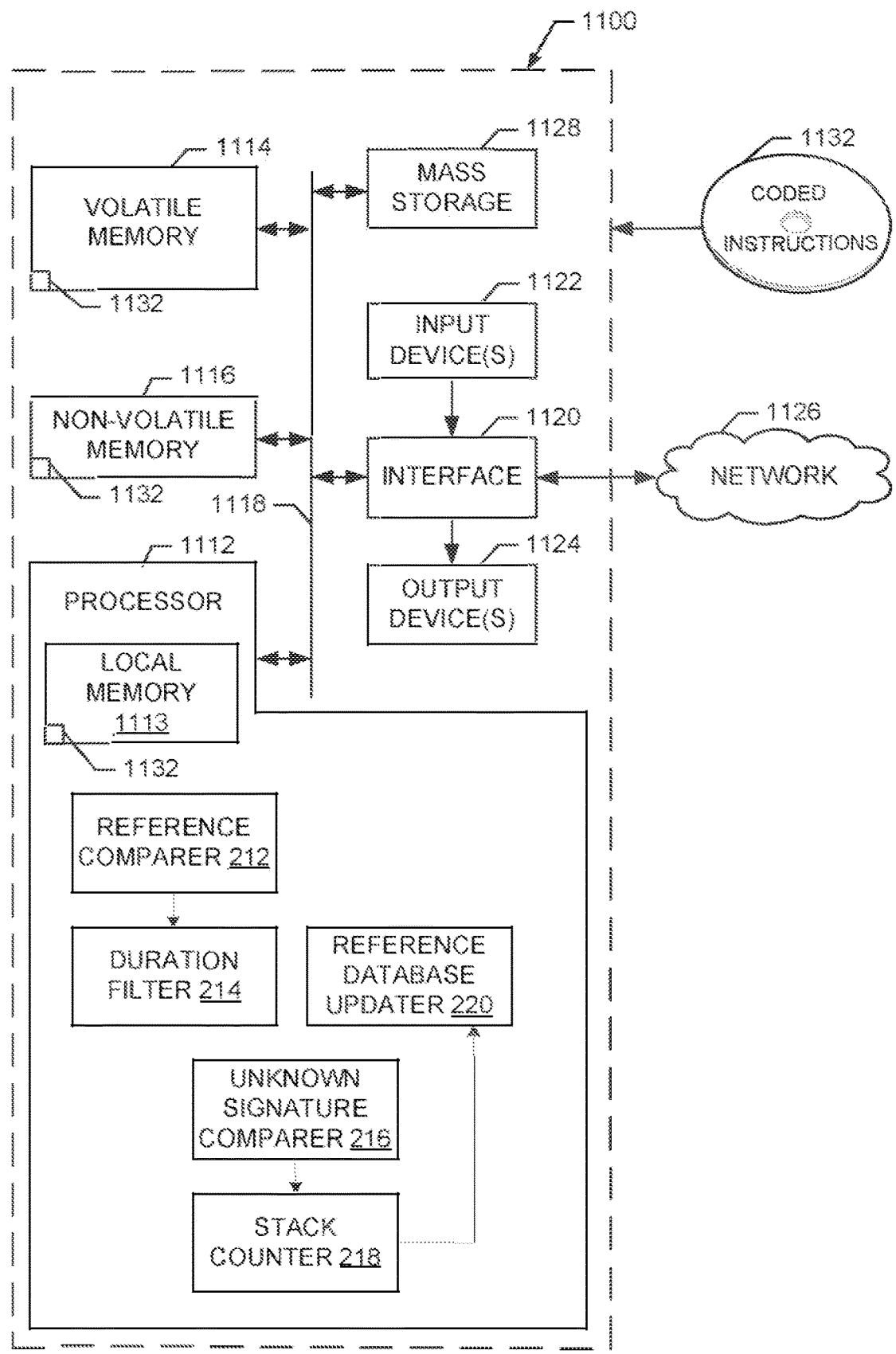
FIG. 11 is a block diagram of an example processor platform capable of executing the instructions of FIGS. 7, 8, 9, and/or 10 to implement the example matcher of FIGS. 1 and/or 2.

FIG. 11 is a block diagram of an example processor platform 1100 capable of executing the instructions of FIGS. 7-10 to implement the matcher 114 of FIG. 1 and/or FIG. 2. The processor platform 1100 can be, for example, a server, a personal computer, a mobile device (e.g., a cell phone, a smart phone, a tablet such as an iPad®), a personal digital assistant (PDA), an Internet appliance, a DVD player, a CD player, a digital video recorder, a Blu-ray player, a gaming console, a personal video recorder, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache) and the matcher 114 including the reference comparer 212, the duration filter 214, the unknown signature comparer 216, the stack counter 218, and the reference database updater 220. The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device (s) 1122 permit(s) a user to enter data and commands into the processor 1112. The input device(s) 1122 can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

The coded instructions 1132 of FIGS. 7-10 may be stored in the mass storage device 1128, in the volatile memory 1114, in the non-volatile memory 1116, and/or on a removable tangible computer readable storage medium such as a CD or DVD.

From the foregoing, it will be appreciated that the above disclosed methods, apparatus and articles of manufacture may aid in identifying, analyzing, comparing, and understanding media and when that media is presented. By associating signatures representative of a piece of unknown (e.g., unreferenced) media from multiple signature generating meters together to form a match core, the unknown media may be more quickly identified, which in turn may provide insights into the preferences and habits of media consumers. Further, comparing signature timestamps of a match core to a network timestamp associated with a URL may be accomplished in fewer operations by a processor, thus reducing processor demand in a computer, as compared to comparing the signature timestamps of each individual unknown signature to the network timestamp piecemeal. Moreover, identifying an unknown signature segment via a URL may make reference signature generation more efficient. Learning about audio media consumers' preferences and habits may help media broadcasters to provide media (e.g., music, movies, television programs, etc.) that media consumers want to hear and to additionally deliver targeted advertisements for products that may interest media consumers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. An audience measurement system comprising:
   at least one processor; and
   a non-transitory computer-readable storage medium having stored therein instructions that, upon execution by the at least one processor, cause the audience measurement system to perform a set of operations comprising:
     obtaining, from a first meter at a first audience measurement location, a first set of unknown signature segments;
     obtaining, from one or more second meters at one or more respective second audience measurement locations, a second set of unknown signature segments;
     selecting a candidate unknown signature segment from the first set of unknown signature segments, wherein the candidate unknown signature segment meets a threshold length;
     comparing individual signatures of the candidate unknown signature segment with individual signatures of one or more unknown signature segments from the second set of unknown signature segments;
     counting a number of times that the individual signatures of the candidate unknown signature segment matches the individual signatures of the unknown signature segments in the second set of unknown signatures segments;
     determining that the candidate unknown signature segment is a matched signature segment when the number of times meets a counter threshold; and
     in response to a determination that the candidate unknown signature segment is a matched signature segment:
       identifying, based on online activity associated with the first audience measurement location, media identifying information associated with the matched signature segment; and
       storing the matched signature segment in association with the media identifying information in a signature reference database as a reference signature.

2. The audience measurement system of claim 1, wherein the set of operations further comprise discarding unknown signature segments collected at the first audience measurement location that do not meet the threshold length.

3. The audience measurement system of claim 1, wherein the media identifying information corresponds to media accessed at the first audience measurement location.

4. The audience measurement system of claim 3, wherein the identifying, based on the online activity associated with the first audience measurement location, the media identifying information comprises:
   comparing:
     (i) timestamps of online activity indicative of accessing the media at the first audience measurement location and
     (ii) timestamps associated with the candidate unknown signature segment; and
   based on the comparing, correlating the online activity indicative of accessing the media with the candidate unknown signature segment.

5. The audience measurement system of claim 1, wherein the identifying, based on the online activity associated with the first audience measurement location, the media identifying information further comprises identifying the media identifying information based on a uniform resource locator indicative of accessing media associated with the media identifying information at the first audience measurement location.

6. The audience measurement system of claim 5, wherein the storing the matched signature segment in the signature reference database further comprises:
   updating the signature reference database to associate the matched signature segment with the media identifying information based on the uniform resource locator.

7. The audience measurement system of claim 1, wherein the set of operations further comprise crediting media exposure to media corresponding to the matched signature segment based on an additional unknown signature matching at least a portion of the matched signature segment.

8. A non-transitory computer-readable storage medium comprising instructions that, when executed by at least one processor, cause performance of a set of operations comprising:
   obtaining, from a first meter at a first audience measurement location, a first set of unknown signature segments;
   obtaining, from one or more second meters at one or more respective second audience measurement locations, a second set of unknown signature segments;
   selecting a candidate unknown signature segment from the first set of unknown signature segments, wherein the candidate unknown signature segment meets a threshold length;
   comparing individual signatures of the candidate unknown signature segment with individual signatures of one or more unknown signature segments from the second set of unknown signature segments;
   counting a number of times that the individual signatures of the candidate unknown signature segment matches the individual signatures of the unknown signature segments in the second set of unknown signatures segments;

determining that the candidate unknown signature segment is a matched signature segment when the number of times meets a counter threshold;

and in response to a determination that the candidate unknown signature segment is a matched signature segment:
- identifying, based on online activity associated with the first audience measurement location, media identifying information associated with the matched signature segment; and
- storing the matched signature segment in association with the media identifying information in a signature reference database as a reference signature.

9. The non-transitory computer-readable storage medium of claim 8, wherein the set of operations further comprise discarding unknown signature segments collected at the first audience measurement location that do not meet the threshold length.

10. The non-transitory computer-readable storage medium of claim 8, wherein the media identifying information corresponds to media accessed at the first audience measurement location.

11. The non-transitory computer-readable storage medium of claim 10, wherein the identifying, based on the online activity associated with the first audience measurement location, the media identifying information further comprises:
- comparing: (i) timestamps of online activity indicative of accessing the media at the first audience measurement location and (ii) timestamps associated with the candidate unknown signature segment; and
- based on the comparing, correlating the online activity indicative of accessing the media with the candidate unknown signature segment.

12. The non-transitory computer-readable storage medium of claim 8, wherein the identifying, based on the online activity associated with the first audience measurement location, the media identifying information further comprises identifying the media identifying information based on a uniform resource locator indicative of accessing media associated with the media identifying information at the first audience measurement location.

13. The non-transitory computer-readable storage medium of claim 8, wherein the set of operations further comprise crediting media exposure to media corresponding to the matched signature segment based on an additional unknown signature matching at least a portion of the matched signature segment.

14. A method comprising:
- obtaining, from a first meter at a first audience measurement location, a first set of unknown signature segments;
- obtaining, from one or more second meters at one or more respective second audience measurement locations, a second set of unknown signature segments;
- selecting a candidate unknown signature segment from the first set of unknown signature segments, wherein the candidate unknown signature segment meets a threshold length;
- comparing individual signatures of the candidate unknown signature segment with individual signatures of one or more unknown signature segments from the second set of unknown signature segments;
- counting a number of times that the individual signatures of the candidate unknown signature segment matches the individual signatures of the unknown signature segments in the second set of unknown signatures segments;
- determining that the candidate unknown signature segment is a matched signature segment when the number of times meets a counter threshold;

and in response to a determination that the candidate unknown signature segment is a matched signature segment:
- identifying, based on online activity associated with the first audience measurement location, media identifying information associated with the matched signature segment; and
- storing the matched signature segment in association with the media identifying information in a signature reference database as a reference signature.

15. The method of claim 14, further comprising:
discarding unknown signature segments collected at the first audience measurement location that do not meet the threshold length.

16. The method of claim 14, wherein the media identifying information corresponds to media accessed at the first audience measurement location.

17. The method of claim 16, wherein the identifying, based on the online activity associated with the first audience measurement location, the media identifying information associated with the matched signature segment further comprises:
- comparing: (i) timestamps of online activity indicative of accessing the media at the first audience measurement location and (ii) timestamps associated with the candidate unknown signature segment; and
- based on the comparing, correlating the online activity indicative of accessing the media with the candidate unknown signature segment.

18. The method of claim 14, wherein the identifying, based on the online activity associated with the first audience measurement location, the media identifying information associated with the matched signature segment further comprises identifying the media identification information based on a uniform resource locator indicative of accessing media associated with the media identifying information at the first audience measurement location.

19. The method of claim 18, further comprising:
updating the signature reference database to associate the matched signature segment with the media identification information based on the uniform resource locator.

20. The method of claim 14, further comprising:
crediting media exposure to media corresponding to the matched signature segment based on an additional unknown signature matching at least a portion of the matched signature segment.

* * * * *